Figures 1, 2:
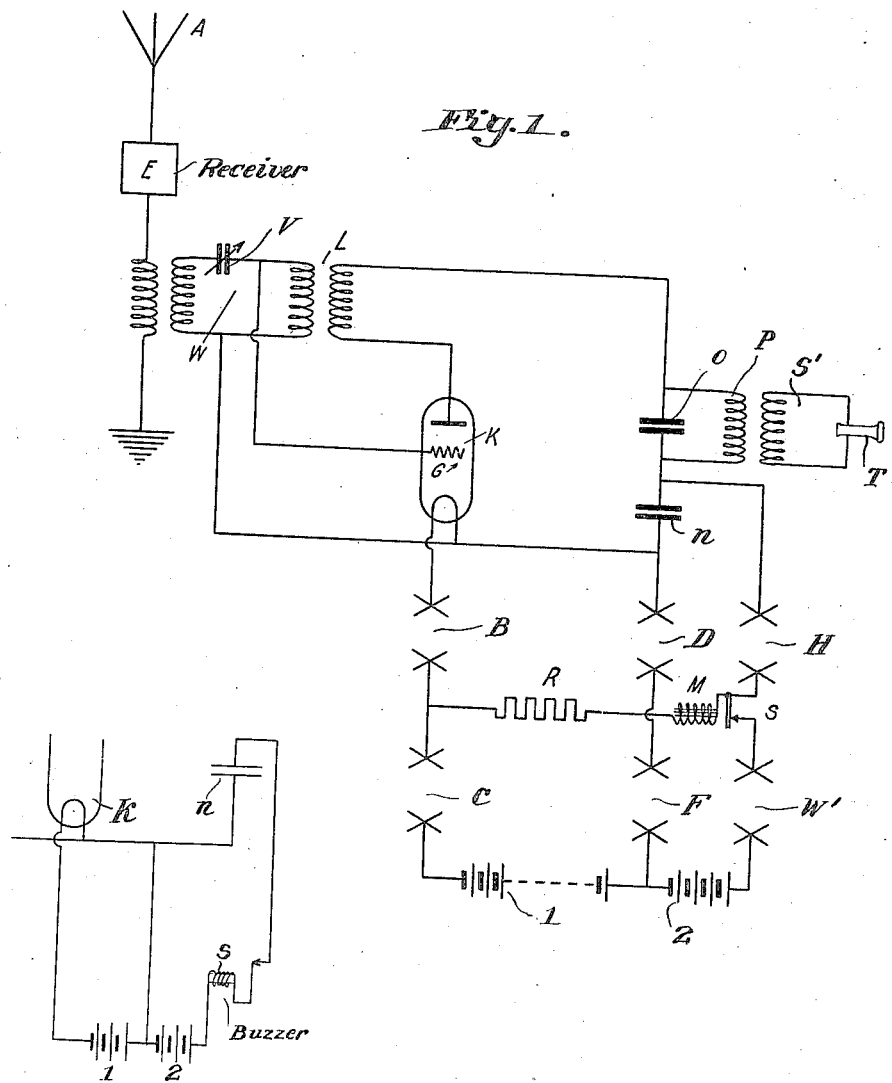

Feb. 20, 1923.

A. LEIB 1,446,425

WAVE METER WITH CATHODE TUBE

Filed Aug. 3, 1922

Inventor
AUGUST LEIB
By his Attorney

Patented Feb. 20, 1923.

1,446,425

UNITED STATES PATENT OFFICE.

AUGUST LEIB, OF BERLIN, GERMANY.

WAVE METER WITH CATHODE TUBE.

Application filed August 3, 1922. Serial No. 579,383.

*To all whom it may concern:*

Be it known that I, AUGUST LEIB, a citizen of the Republic of Germany, and a resident of Hallesches Ufer 12/13, Berlin, S. W. 11, Germany, have invented new and useful Improvements in Wave Meters with Cathode Tubes (for which I have filed an application in Germany, Aug. 2, 1921), of which the following is a specification, accompanied by drawings.

Wave meters provided with a cathode tube are well known and it has heretofore been proposed to provide such meters with a back-coupling whereby the wave meter operates as a sender, and the tunings are determined by means of the telephone in a receiver at maximum receiving tone strength. Under certain circumstances this arrangement has the draw-back that the wave meter, which operates without damping, that is, so as to produce a continuous wave, does not give a tone but must be made audible in the receiver by means of a second superimposed sender or by other suitable tone producing means.

The invention consists in transforming a normal oscillating circuit, which is back-coupled to an audion tube, into a sounding sender by very simple means. The means employed consists in an electromagnetic buzzer which is connected in the circuit between the anode or plate circuit and the oscillating circuit.

The arrangement may be particularly simplified if the magnets of the buzzer are wound with suitable thin wire and the interrupter connected in the anode circuit in such a manner that it is operated by the anode current as a self-interrupter.

In the drawing,

Fig. 1 is a diagrammatic representation of a wave meter embodying the invention, and Fig. 2 is a diagrammatic representation of a wave meter having a buzzer in its anode circuit arranged to be operated by the anode current.

The drawing exemplifies a circuit arrangment in which A is the antenna, E the receiver, W the wave meter circuit and K the audion tube, the grid G which is connected to the anode circuit through a back-coupling L. R is a resistance and M the coil of the buzzer S operating as a self-interrupter.

As shown, the circuit arrangement also includes switches B, C, D, F, H, and W', a battery comprising portions 1 and 2, and condensers N and O in the oscillating circuit on the output side of the tube K. The condenser O is preferably arranged in parallel with an inductance coil P, and coupled with the coil P is a circuit S' which includes a telephone T.

The current for heating the filament of the tube K passes from the portion 1 of the battery through the switches F and D, thence to the filament, and finally through the switches B and C to the negative side of the battery. The plate circuit of the tube K may be traced from the portions 1 and 2 of the battery in series through the switch W', buzzer S, switch H, back-coupling L, tube K, and switches B and C. The radio-frequencies generated by the tube K are short-circuited around the battery 1, 2 through the condenser N. The buzzer circuit is from the battery through switch W, coil M, resistance R, and switch C back to the battery.

The circuit W, hereinbefore mentioned, is one of the oscillatory circuits of the wave meter, and it includes a variable condenser V which may be adjusted to vary the length of the waves produced by the wave meter.

The action of the arrangement shown in Fig. 2 is similar to that of the arrangement shown in Fig. 1 and previously described except that the buzzer S is arranged to be operated by the anode current as heretofore indicated.

Having described my invention, what I claim is:

1. A circuit arrangement comprising an antenna, a receiver coupled with the antenna, and a wave meter, said wave meter comprising a three-electrode vacuum tube, an oscillatory circuit coupled with the antenna, and a buzzer in the anode circuit of the tube for interrupting the current generated by the wave meter.

2. A circuit arrangement comprising an antenna, a receiver coupled with the antenna, and a wave meter also coupled with the antenna, said wave meter comprising a three-electrode vacuum tube, a tuned circuit coupled with the antenna and connected with the grid of the tube, an oscillating circuit on the output side of the tube, back-coupled to said tuned circuit, and a buzzer in the anode circuit of the tube for interrupting the current generated by the wave meter so as to produce a tone in the receiver.

3. A wave meter comprising a three-electrode vacuum tube, a tuned grid circuit for the tube, an anode circuit back-coupled to the grid circuit, and a buzzer arranged in the anode circuit of the tube for operation by the anode current as a self-interrupter.

4. A wave meter comprising a three-electrode vacuum tube, an oscillatory circuit, an anode circuit for the tube, and an electromagnetic buzzer wound with thin wire and arranged in the anode circuit for operation by the anode current.

5. A circuit arrangement comprising an antenna, a receiver coupled with the antenna, and a wave meter also coupled with the antenna, said wave meter comprising a buzzer for interrupting the current generated by the wave meter and said buzzer being arranged in circuit with the power source of the anode circuit of the wave meter.

6. A circuit arrangement comprising an antenna, a receiver coupled with the antenna, and a wave meter, said wave meter comprising a three-electrode vacuum tube, a closed circuit coupled with the antenna and connected to the grid of the tube, an oscillating circuit on the output side of the tube, back-coupled to the first-mentioned circuit, a buzzer in the anode circuit of the tube for interrupting the current generated by the tube, and a variable condenser in said first-mentioned circuit for varying the length of the waves produced by the tube, said condenser enabling waves of known length to be produced by the wave meter.

AUGUST LEIB.